United States Patent
Yu et al.

(10) Patent No.: US 7,860,008 B2
(45) Date of Patent: Dec. 28, 2010

(54) METHOD FOR RECEIVING DATA AND COMMUNICATION DEVICE

(75) Inventors: Wen-Chang Yu, Taoyuan County (TW); Well-Chen Chua, Taipei County (TW); Muh-Rong Yang, Taipei (TW)

(73) Assignee: Industrial Technology Research Institute, Hsinchu (TW)

(\*) Notice: Subject to any disclaimer, the term of this patent is extended or adjusted under 35 U.S.C. 154(b) by 242 days.

(21) Appl. No.: 12/139,557

(22) Filed: Jun. 16, 2008

(65) Prior Publication Data

US 2009/0213772 A1 Aug. 27, 2009

(30) Foreign Application Priority Data

Feb. 21, 2008 (TW) ............................. 97106147 A

(51) Int. Cl.
*H04L 12/26* (2006.01)
(52) U.S. Cl. ..................................... 370/235; 370/473
(58) Field of Classification Search ................. 370/229, 370/231, 235, 235.1, 253
See application file for complete search history.

(56) References Cited

U.S. PATENT DOCUMENTS

| | | | | |
|---|---|---|---|---|
| 5,477,550 A | * | 12/1995 | Crisler et al. ............... | 714/748 |
| 6,219,713 B1 | * | 4/2001 | Ruutu et al. ................ | 709/235 |
| 7,161,978 B2 | * | 1/2007 | Lu et al. ..................... | 375/219 |
| 2004/0202110 A1 | * | 10/2004 | Kim .......................... | 370/235 |
| 2005/0190698 A1 | | 9/2005 | Mangin et al. | |
| 2010/0046374 A1 | * | 2/2010 | Ludwig et al. ............. | 370/236 |

\* cited by examiner

*Primary Examiner*—Brenda Pham
(74) *Attorney, Agent, or Firm*—Thomas, Kayden, Horstemeyer & Risley

(57) ABSTRACT

A method for receiving data is provided. Multiple packages are received according to a sliding window W(N). If a starting package of the packages is received successfully, the W(N) is slid to a W(N+1). If a non-starting package of the packages is received successfully, the corresponding counter is activated for counting. If the starting package of the packages is not successfully received and part of multiple counters counts to an up-limited value, the W(N) slides to the W(N+1). Other packages are continuously received according to the W(N+1), and whether the block sequence numbers (BSNs) of the counters located in the overlap area between the W(N) and the W(N+1) are determined. When at least one BSN to which at least one counter corresponds is not located in the overlap area, the at least one counter corresponding to the at least one BSN not located in the overlap area is reset.

20 Claims, 11 Drawing Sheets

```
BSN   64  65  66           83  84  85  86]          92  93  94  95
      32  33  34           51  52  53  54           60  61  62  63
       0   1   2    ...    19  20  21  22    ...    28  29  30 [31
                                   ⌐W(N+1)                      ⌐W(N)
      ┌────┬────┬────┐    ┌────┬────┬────┬────┐    ┌────┬────┬────┬────┐
      │C(0)│C(1)│C(2)│ ...│C(19)│C(20)│C(21)│C(22)│...│C(28)│C(29)│C(30)│C(31)│
      └────┴────┴────┘    └────┴────┴────┴────┘    └────┴────┴────┴────┘
```

FIG. 7G

METHOD FOR RECEIVING DATA AND
COMMUNICATION DEVICE

This application claims the benefit of Taiwan application Serial No. 97106147, filed Feb. 21, 2008, the subject matter of which is incorporated herein by reference.

BACKGROUND OF THE INVENTION

1. Field of the Invention

The invention relates in general to a method for receiving data and the communication device, and more particularly to a data receiving method capable of saving counter resources and promptly positing the sliding window and a communication device thereof.

2. Description of the Related Art

In a wireless communication system, the packages may be lost or may generate error during data transmission due to the fast change in transmission channels, multiple paths or decay in transmission signals. The automatically repeat request (ARQ) mechanism is one of the technologies for resolving the above problem. The ARQ mechanism uses the acknowledge label value of the acknowledge signal between the transmitter and the receiver to indicate whether a package is received successfully.

If the acknowledge label value of the acknowledge signal transmitted to the transmitter from the receiver is "1", it is indicated that the corresponding package has been received successfully. If the acknowledge label value of the acknowledge signal transmitted to the transmitter from the receiver is "0", it is indicated that the corresponding package is missed or received unsuccessfully. The transmitter determines whether to re-transmit corresponding package to the receiver according to the received acknowledge signal.

However, in the conventional ARQ mechanism, after the transmitter transmits a package, the transmitter cannot transmit the next package until the receiver has sent back a acknowledge signal through a feedback channel. As the transmitter waists too much time waiting for the acknowledge signal, the overall transmission efficiency of the wireless communication system is poor. To improve the overall efficiency, another transmitter capable of transmitting multiple packages is thus provided. The receiver corresponding to the transmitter receives the packages by a sliding window, and each package corresponds to a block sequence number (BSN).

After the receiver has successfully received the package, the counter to which the BSN corresponding to the package corresponds is activated for counting. If the counter counts to an up-limited value, then the receiver, according to the ARQ mechanism, will automatically slides the starting position of the sliding window to the position corresponding to the package to be received next, lest the efficiency of the receiver might be affected if a particular package is not received and the receiver has to wait for a long time.

However, the BSNs of the packages used in protocol 802.16d or 802.16e can be as high as 2048. If the abovementioned mechanism of automatic sliding window is used to receive the packages, then 2048 counters will be required, not only largely increasing the cost for the receiver but also occupying too much space of chips due to a large number of counters used. Therefore, how to use the resources of the counters efficiently and promptly and precisely position the starting position of the sliding window so as to achieve a media access control (MAC) layer ARQ mechanism featured by high efficiency, low cost and low chip size has been an imminent issue to be resolved.

SUMMARY OF THE INVENTION

The invention is directed to a method for receiving data and a communication device. The sliding window is promptly positioned by way of determining whether the counter is re-used to save the resources of the counters according to whether the counter is located in the overlap area between two subsequent sliding windows and by way of using a parallel grouping mechanism.

According to a first aspect of the present invention, a method for receiving data is provided. The method includes the following steps. Multiple packages are received according to a sliding window W(N) having been slid for N times, wherein N is a positive integer. The sliding window W(N) corresponds to multiple block sequence numbers (BSNs). The packages and multiple counters all correspond to the BSNs to which the W(N) corresponds. If a starting package of the packages is received successfully, then the W(N) is slid to a W(N+1). If a non-starting package of the packages is received successfully, then the counter corresponding to the non-starting package is activated for counting. If the starting package of the packages is not received successfully and part of the counters counts to an up-limited value, then the W(N) is slid to W(N+1). Other multiple packages are continuously received according to the W(N+1), and whether the BSNs of the counters are located in the overlap area between the W(N) and the W(N+1) is determined. When at least one BSN to which at least one counter among the counters corresponds is not located in the overlap area, the at least one counter corresponding to the at least one BSN not located in the overlap area is reset. Each of the at least one counter corresponding to the at least one BSN not located in the overlap area corresponds to another BSN.

According to a second aspect of the present invention, a method for receiving data is provided. The method includes the following steps. Multiple packages are received according to a sliding window W(N) having been slid for N times, wherein N is a positive integer. The sliding window W(N) corresponds to multiple block sequence numbers (BSNs). The packages and multiple counters all correspond to the BSNs to which the W(N) corresponds. If a starting package of the packages is received successfully, then the W(N) is slid to a W(N+1). If a non-starting package of the packages is received successfully, then the counter corresponding to the non-starting package is activated for counting. If the starting package of the packages is not received successfully and part of the counters counts to an up-limited value, then multiple count label values indicating whether each of the counting values of the counters has achieved an up-limited value are rewired to obtain a rewired time-out table. The rewired time-out table has multiple first groups each having a first group value. The first group values form a group time-out table. If the starting package of the packages is not received successfully and parts of the counting values of the counters have achieved the up-limited value, then the multiple acknowledge label values indicating whether the packages are received successfully are rewired to obtain a rewire acknowledge table. The rewire acknowledge table has multiple second groups each having a second group value. The second group values form a group acknowledge table. The sliding window W(N) is slid to a sliding window W(N+1) according to the group time-out table and the group acknowledge table. Other multiple packages are continuously received according to the W(N+1).

According to a third aspect of the present invention, a communication device including a receiver is provided. The receiver is for receiving multiple packages according to a sliding window W(N) having been slid for N times, wherein N is a positive integer. The sliding window W(N) corresponds to multiple block sequence numbers (BSNs). The packages and multiple counters all correspond to the BSNs to which the W(N) corresponds. If the receiver receives a starting package of the packages successfully, then the receiver further slides the W(N) to a W(N+1). If the receiver receives a non-starting package of the packages successfully, then the receiver further activates the counter corresponding to the non-starting package for counting. If the receiver does not receive the starting package of the packages successfully and part of the counters counts to an up-limited value, then the receiver further slides the W(N) to a W(N+1). The receiver further continuously receives other multiple packages according to the W(N+1) and determines whether the BSNs of the counters are located in the overlap area between the W(N) and the W(N+1). When at least one BSN to which at least one counter among the counters corresponds is not located in the overlap area, the receiver further resets the at least one counter corresponding to the at least one BSN not located in the overlap area. Each of the at least one counter corresponding to the at least one BSN not located in the overlap area corresponds to another BSN.

The invention will become apparent from the following detailed description of the preferred but non-limiting embodiments. The following description is made with reference to the accompanying drawings.

BRIEF DESCRIPTION OF THE DRAWINGS

FIG. 7A shows an example of the relationship between the sliding window W(N) and the sliding window W(N+1) according to an embodiment of the invention when previous receiving starting pointer PP(N+1) and current receiving starting pointer CP(N+1) are located in area a;

FIG. 7B shows an example of the relationship between the sliding window W(N) and the sliding window W(N+1) according to an embodiment of the invention when previous receiving starting pointer PP(N+1) and current receiving starting pointer CP(N+1) are located in area b;

FIG. 7C shows an example of the relationship between the sliding window W(N) and the sliding window W(N+1) according to an embodiment of the invention when previous receiving starting pointer PP(N+1) and current receiving starting pointer CP(N+1) are located in area c;

FIG. 7D shows an example of the relationship between the sliding window W(N) and the sliding window W(N+1) according to an embodiment of the invention when previous receiving starting pointer PP(N+1) and current receiving starting pointer CP(N+1) are located in area d;

FIG. 7E shows an example of the relationship between the sliding window W(N) and the sliding window W(N+1) according to an embodiment of the invention when previous receiving starting pointer PP(N+1) and current receiving starting pointer CP(N+1) are located in area e;

FIG. 7F shows an example of the relationship between the sliding window W(N) and the sliding window W(N+1) according to an embodiment of the invention when previous receiving starting pointer PP(N+1) and current receiving starting pointer CP(N+1) are located in area f; and FIG. 7G shows an example of the relationship between the sliding window W(N) and the sliding window W(N+1) according to an embodiment of the invention when previous receiving starting pointer PP(N+1) and current receiving starting pointer CP(N+1) are located in area g.

DETAILED DESCRIPTION OF THE INVENTION

The invention provides a method for receiving data and a communication device thereof. After the sliding window slides, whether to reset at least part of the counters or to enable the counters to continue counting is determined according to whether the counters are located in the overlap area between two subsequent sliding windows. Thus, as the counters can be re-used, the required number of counters can be reduced to be less than a half of the maximum BSN value of the packages, hence decreasing both cost and chip size. By way of parallel grouping mechanism, the next starting position of the sliding window is promptly and precisely determined.

Figure 1:
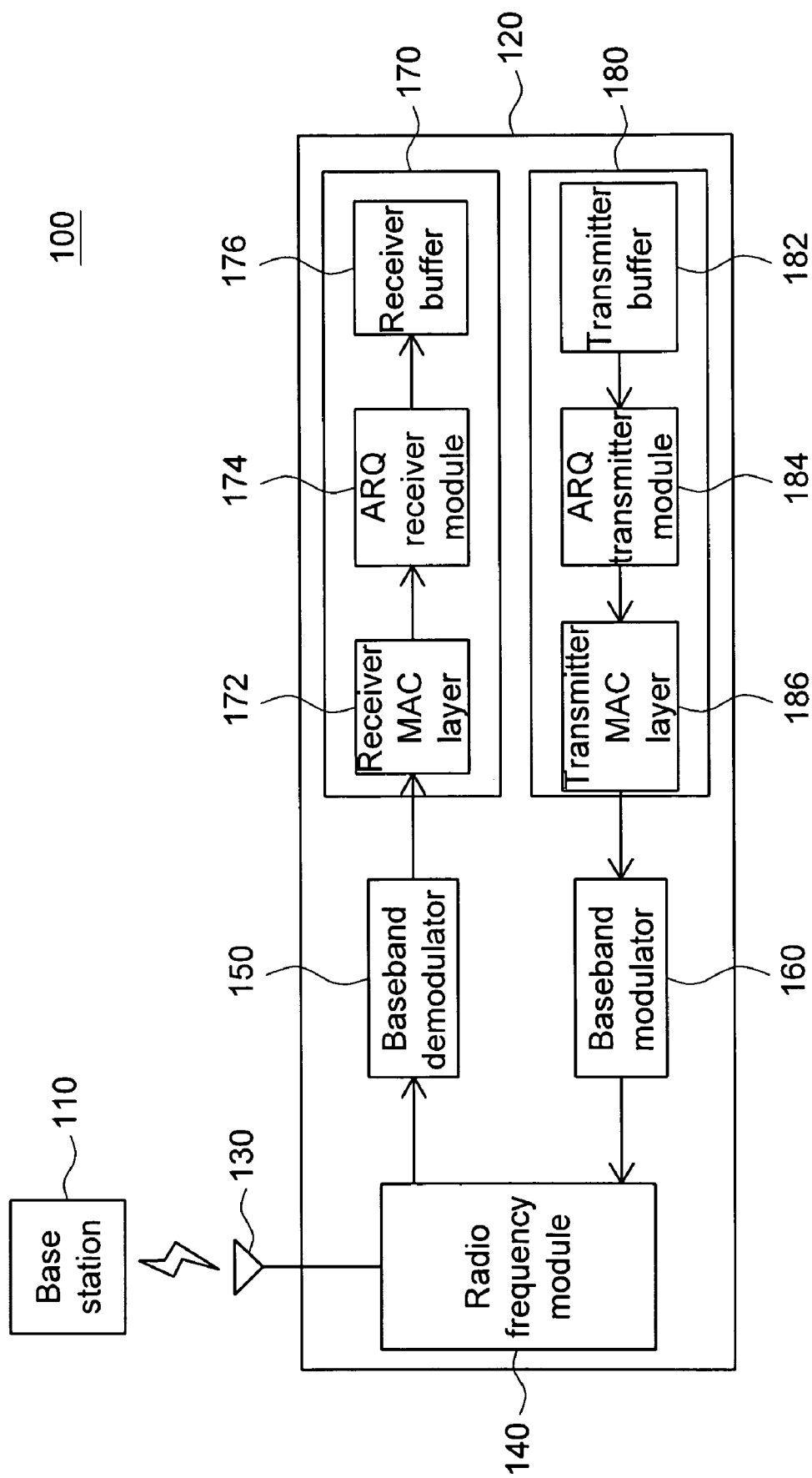
FIG. 1 shows a block diagram of an example of a communication system used in a communication device according to an embodiment of the invention.

Referring to FIG. 1, a block diagram of an example of a communication system used in a communication device according to an embodiment of the invention is shown. The communication system 100 includes a transmitting device and a receiving device. The transmitting device, such as a base station 110, at least includes a transmitter. The receiving device is a communication device 120 for example. The communication device 120, such as a subscriber station or a mobile station, includes an antenna 130, a radio frequency module 140, a baseband demodulator 150, a baseband modulator 160, a receiver 170 and a transmitter 180. However, the receiving device is not limited thereto and can include a receiver 170 only.

The antenna 130 receives a first radio frequency signal from the base station 110. The radio frequency module 140 converts the first radio frequency signal into a first baseband signal. The baseband demodulator 150 de-modulates the first baseband signal into a first demodulation signal. The receiver 170 includes a receiver MAC layer 172, an ARQ receiver module 174 and a receiver buffer 176. The receiver MAC layer 172 is for receiving the first demodulation signal. The ARQ receiver module 174 is for retrieving multiple packages from the first demodulation signal according to a sliding window. The receiver buffer 176 is for temporarily storing the received packages.

The transmitter 180 includes a transmitter buffer 182, an ARQ transmitter module 184 and a transmitter MAC layer 186. The transmitter buffer 182 is for temporarily storing multiple packages. The ARQ transmitter module 184 is for outputting the packages. The transmitter MAC layer 186 is for accessing the outputted packages. The baseband modulator 160 modulates the packages into a second baseband signal. The radio frequency module 140 modulates the second baseband signal into a second radio frequency signal. The antenna 130 transmits the second radio frequency signal to the base station 110.

The receiver 170 is for receiving multiple packages according to a sliding window W(N) having been slid for N times, wherein N is a positive integer. The sliding window W(N) corresponds to multiple BSNs. Both the packages and multiple counters all correspond to the multiple BSNs to which the W(N) corresponds. If the receiver successfully receives a starting package of the packages, then the receiver 170 slides the W(N) to a W(N+1). If the receiver 170 successfully receives a non-starting package of the packages, then the receiver 170 activates the counter corresponding to the non-starting package for counting. If the receiver 170 does not successfully receive the starting package of the packages and part of the counters counts to an up-limited value, then the receiver 170 slides the W(N) to the W(N+1).

The receiver 170 further continues to receive other multiple packages according to the W(N+1) and determine whether the BSN to which multiple counters correspond is located in the overlap area between the W(N) and the W(N+1), and resets the counters corresponding to the BSNs not located in the overlap area. The counters corresponding to the BSNs not located in the overlap area respectively correspond to another BSN. The operations of the receiver 170 are further elaborated below.

The receiver 170 receives y packages according to the sliding window W(N) having been slid for N times, and the receiver 170 sends back y acknowledge label values respectively indicating whether the y packages are received successfully, wherein y being a positive integer indicates the window size of the sliding window. For example, if the acknowledge label value is "1", then the corresponding package is correctly received; if the acknowledge label value is "0", then the corresponding package is missed or not received successfully. However, the scenarios are not limited thereto. Besides, the packages can be transmitted by a transmitter (not illustrated in the diagram) of the base station 110 but is not limited thereto.

The starting position of the sliding window W(N) corresponds to one among multiple BSNs. For example, the BSN of the packages transmitted according to protocol 802.16d or 802.16e can be as high as 2048. Preferably, the window size of the sliding window is 32, 64, 128 or 256 unit lengths but is not limited thereto. The window size of the sliding window being smaller than a half of the value of the maximum BSN would do. For example, the window size of the sliding window is 1024.

Figure 2A:
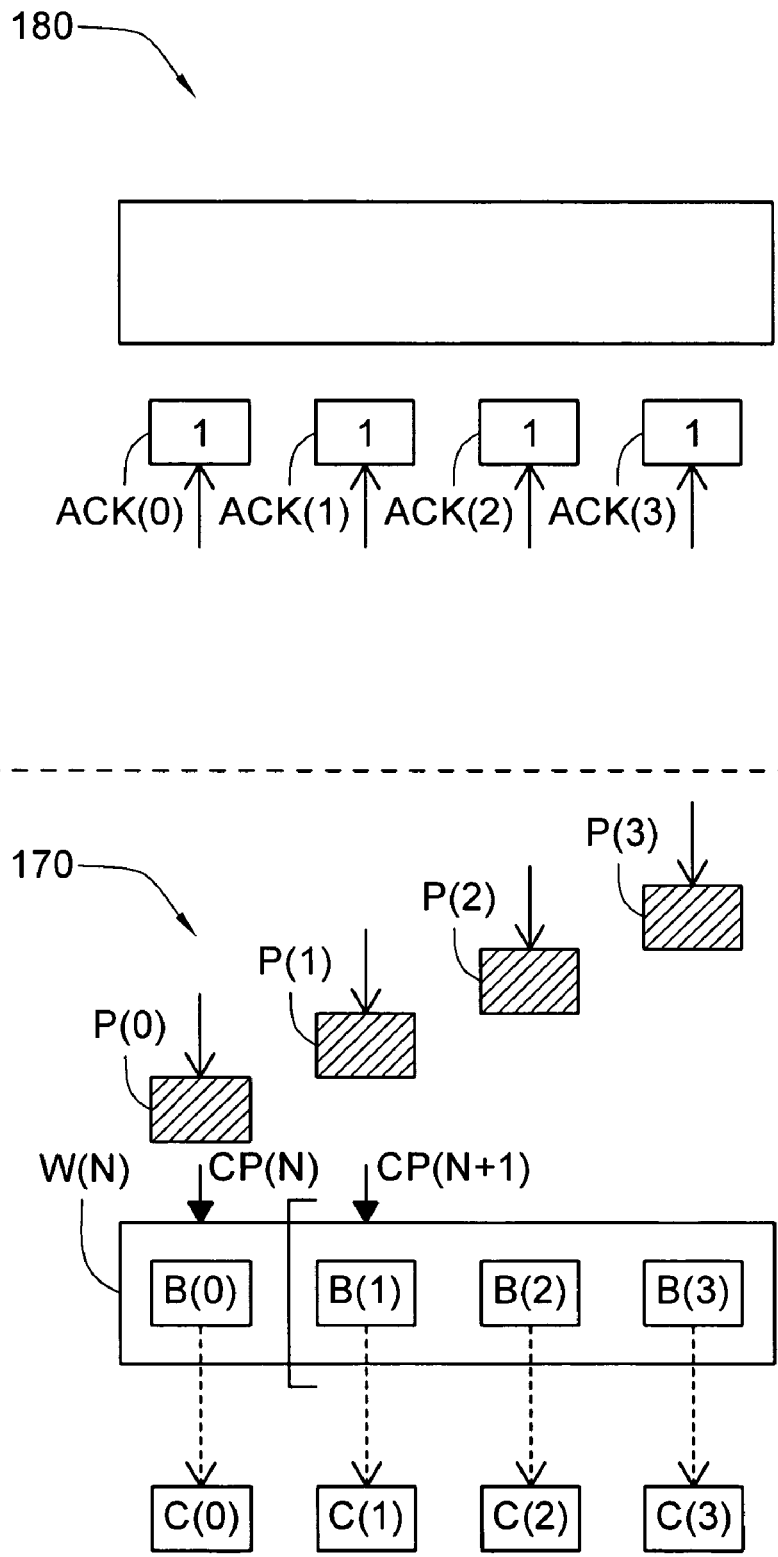
FIG. 2A shows a perspective of an example of a receiver receiving data.

Referring to FIG. 2A, a perspective of an example of a receiver 170 receiving data is shown. The method for receiving data disclosed in the present embodiment of the invention is used in the ARQ mechanism of MAC layer 172 of the receiver 170. The receiver 170 has a current receiving starting pointer CP(N) and a previous receiving starting pointer PP(N) (not illustrated in FIG. 2A). The current receiving starting pointer CP(N) points to the BSN to which the current starting position of the sliding window W(N) corresponds, and the BSN is exemplified as B(0) here. The previous receiving starting pointer PP(N) points to the BSN to which the starting position of a previous sliding window W(N−1) corresponds. The y packages sequentially correspond to y successive BSNs starting from the BSN to which the current receiving starting pointer CP(N) corresponds.

For simplification, y is exemplified as 4 in FIG. 2A. Moreover, the receiver 170 has y counters corresponding to the window size y of the sliding window. For example, the receiver 170 has 4 counters C(0)~C(3). The y counters correspond to y successive BSNs starting from the BSN to which the current receiving starting pointer CP(N) corresponds. For example, the 4 counters C(0)~C(3) respectively correspond to 4 successive BSNs B(0)~B(3). Preferably, the BSN value to which the counter C(0) may correspond is the BSN value whose remainder is 0 when the BSN value is divided by y, the BSN values to which the counters C(1)~C(y−1) may correspond respectively are the BSN values whose remainders are respectively 1~(y−1) when the BSN values are divided by y. At a particular time point, the BSNs to which the counters C(0)~C(y−1) correspond are determined according to the BSN to which the current receiving starting pointer CP(N) corresponds.

The receiver 170 receives y packages such as packages P(0)~P(3) and sends back y acknowledge label values such as acknowledge label values ACK(0)~ACK(3). If the receiver 170 successfully receives a starting package P(0) of the y packages, then the receiver 170 slides the sliding window W(N) to a sliding window W(N+1). The abovementioned starting package P(0) is the package corresponding to the BSN to which the current receiving starting pointer CP(N) corresponds. Meanwhile, there is no restriction regarding whether to activate the counter C(0) corresponding to the starting package P(0). If the receiver 170 successfully receives a non-starting package of the y packages, such as the package P(1) for example, then the receiver 170 further activates the corresponding counter such as the counter C(1) for counting. The abovementioned non-starting package is a package other than the package corresponding to the BSN to which the current receiving starting pointer CP(N) corresponds, such as the packages P(1)~P(y−1) for example. If the receiver 170 slides the sliding window W(N) to the sliding window W(N+1), then the current receiving starting pointer CP(N+1) points to the BSN value B(1), and the previous receiving starting pointer PP(N+1) points to the BSN value B(0). Meanwhile, the counters C(0)~C(3) correspond to y successive BSNs starting from the BSN to which the current receiving starting pointer CP(N+1) points. For example, the current receiving starting pointer CP(N+1) points to the BSN values B(4), B(1), B(2) and B(3) respectively. The counter C(0) changes to be corresponding to the BSN value B(4), so the counter C(0) can be re-used.

Figure 2B:
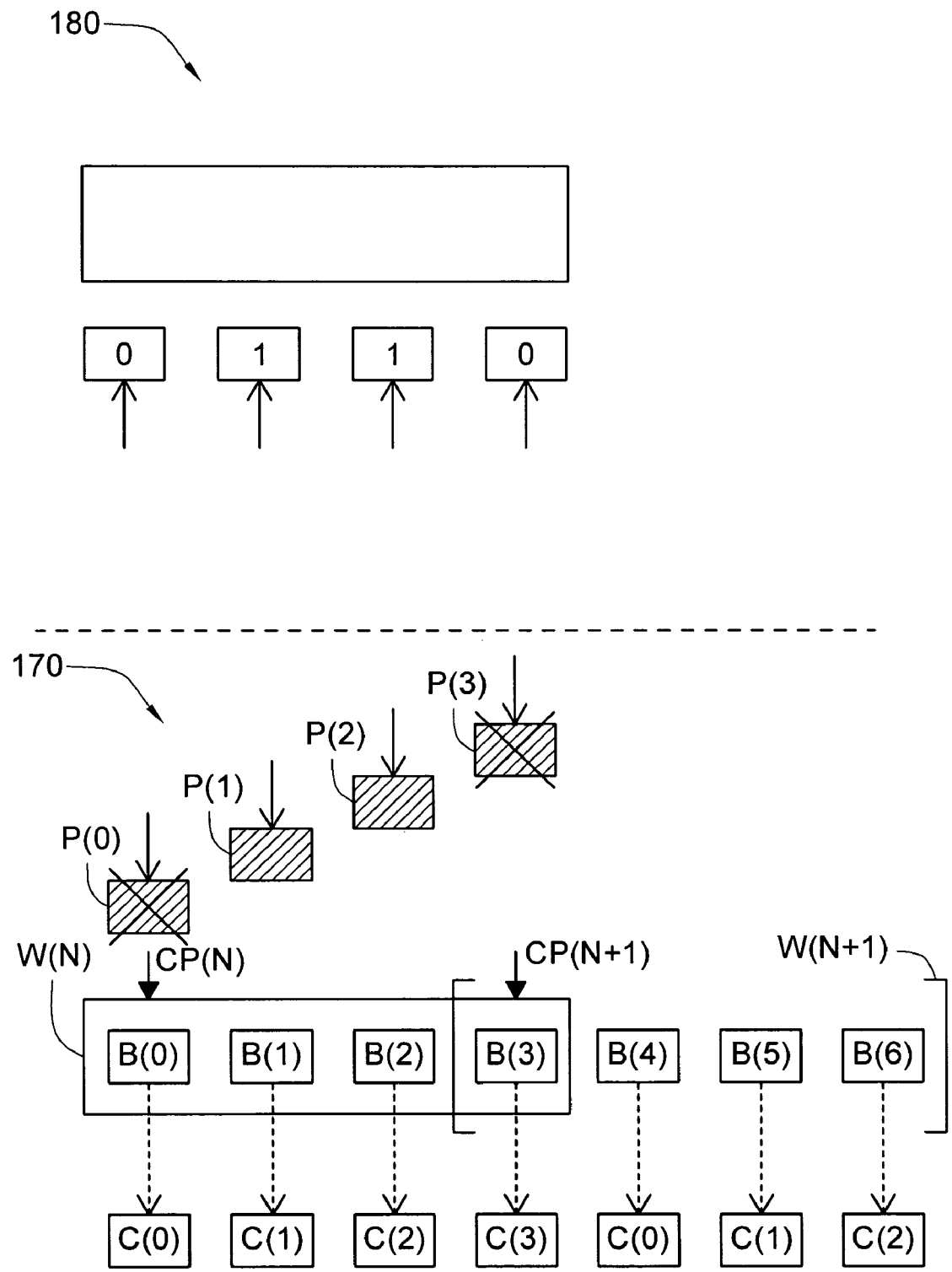
FIG. 2B shows a perspective of another example of the receiver receiving data.

Referring to FIG. 2B, a perspective of another example of the receiver 170 receiving data is shown. If the receiver 170 does not successfully receives the starting package of the y packages and part of the y counters counts to an up-limited value, then the receiver 170 further slides the sliding window W(N) to a sliding window W(N+1) and changes the current receiving starting pointer CP(N) to a current receiving starting pointer CP(N+1) pointing to the BSN to which the first un-received package following the maximum of the BSNs corresponding to the activated counters having counted to the up-limited value corresponds.

For example, if the receiver 170 does not successfully receive the starting package P(0) but successfully receives non-starting packages P(1) and P(2), the counter C(0) will not but the counters C(1) and C(2) will be activated for counting. When one of the counters C(1) and C(2) has counted to an up-limited value, that is, time out, the receiver 170 further sides the sliding window W(N) to the sliding window W(N+1), and changes the current receiving starting pointer CP(N) to the current receiving starting pointer CP(N+1) pointing to the BSN to which the first un-received package following the maximum of the BSN values B(1) and B(2) corresponding to the activated counters having counted to the up-limited value corresponds, that is, B(2) the BSN to which the first un-received package corresponds is. Following B(2), the BSN to which the first un-received package corresponds is B(3). Meanwhile, the sliding window W(N+1) corresponds to the BSN values B(3)~B(6).

The receiver 170 further determines whether the BSNs to which the counters correspond is located in the overlap area between the W(N) and the W(N+1) according to the current receiving starting pointer CP(N+1) (pointing to BSN value B(3)) and the previous receiving starting pointer PP(N+1) (pointing to BSN value B(0)) and respectively resets the counters corresponding to the BSNs not located in the overlap area. The counters corresponding to the BSNs not located in the overlap area correspond to another BSN. For example, in the sliding window W(N), the counters C(0)~C(3) correspond to the BSN values B(0)~B(3), and the receiver 170 determines whether the BSN values B(0)~B(3) are located in the overlap area between the sliding window the W(N) and the sliding window W(N+1). As the BSN value B(3) is included in both the W(N) and the W(N+1), it is determined that the BSN value B(3) is located in the overlap area between the W(N) and the W(N+1). Therefore, the BSN values B(0), B(1) and B(2) are not located in the overlap area. Thus, the receiver 170 resets the counters C(0)~C(2) corresponding to the BSN values B(0), B(1) and B(2). The counters C(0)~C(2) respectively correspond to BSN value B(4), B(5) and B(6), so that the counters C(0)~C(2) are re-used.

Referring to FIG. 2B. The receiver 170 further updates the previous receiving starting pointer PP(N) as a previous receiving starting pointer PP(N+1) pointing to the BSN such as BSN (0) to which the current receiving starting pointer CP(N) corresponds. Furthermore, the receiver 170 continues to receive another y packages according to the current receiving starting pointer CP(N+1) pointing to the BSN value B(3).

The receiver 170 further determines whether the BSN to which the n-th successfully received package corresponds is located in the overlap area between the sliding window W(N) and the sliding window W(N+1) according to the current receiving starting pointer CP(N+1) pointing to BSN value B(3) and the previous receiving starting pointer PP(N+1) pointing to BSN value B(0). If yes, the counter corresponding to the n-th package is not reset; otherwise, the receiver resets the counter corresponding to the n-th package and the counter corresponding to the n-th package automatically corresponds to another BSN value.

Figure 3:
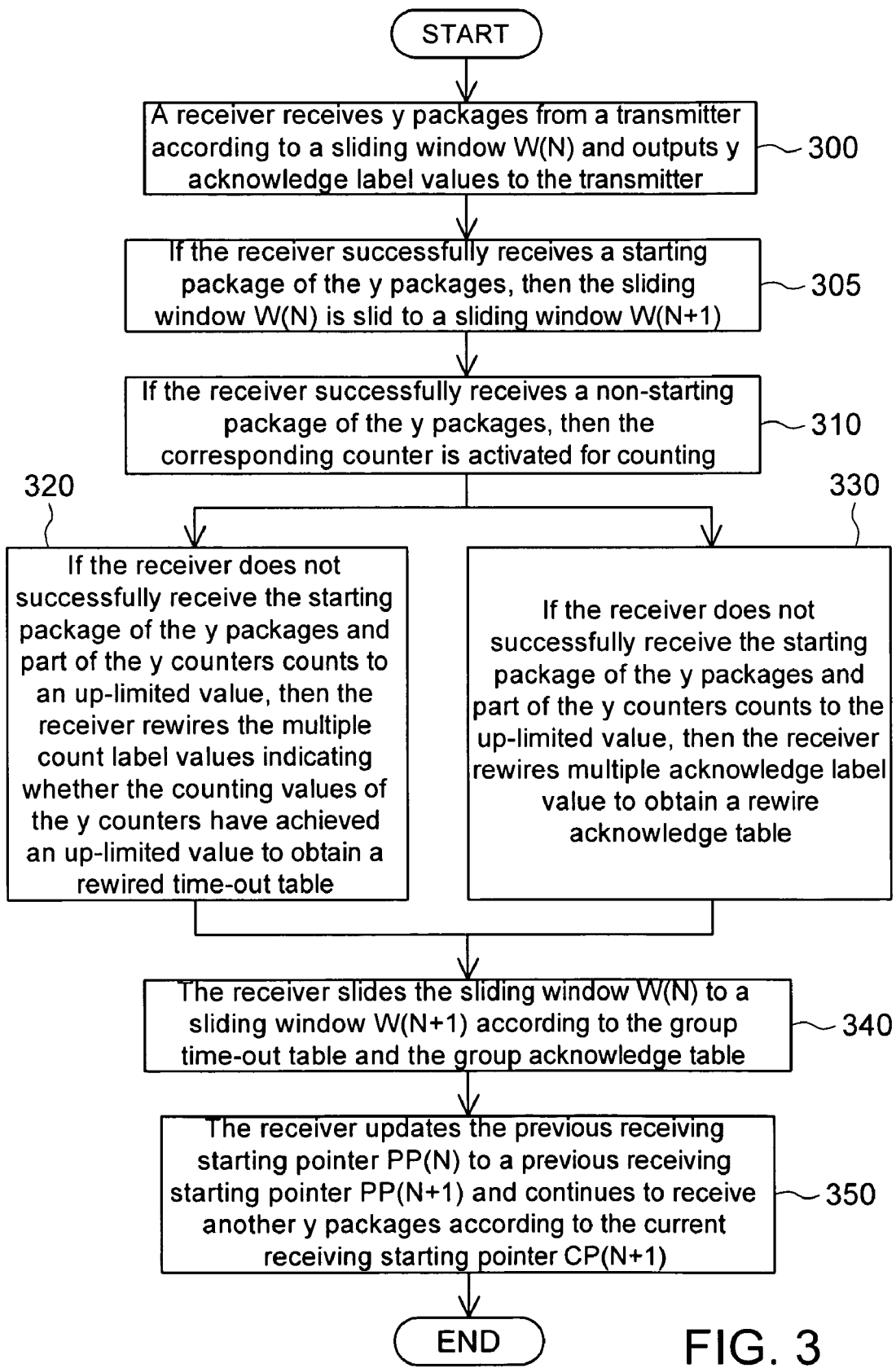
FIG. 3 shows a flowchart of a method for receiving data when the communication device of an embodiment of the invention adopts a parallel grouping mechanism.

The communication device of the present embodiment of the invention can further incorporate a parallel grouping mechanism. For simplification of elaboration, y is exemplified as 32, and the current receiving starting pointer CP(N) points to the BSN value B(4). Referring to FIG. 3, a flowchart of a method for receiving data when the communication device of an embodiment of the invention adopts a parallel grouping mechanism is shown. Firstly, the method begins at step 300, a receiver 170 receives y packages from a transmitter according to a sliding window W(N) and outputs y acknowledge label values to the transmitter, wherein the y acknowledge label values respectively indicate whether the y packages are received successfully. Next, the method proceeds to step 305, if the receiver 170 successfully receives a starting package of the y packages, then the sliding window W(N) is slid to a sliding window W(N+1). Then, the method proceeds to step 310, if the receiver 170 successfully receives a non-starting package of the y packages, then the corresponding counter is activated for counting.

After that, the method proceeds to step 320, if the receiver 170 does not successfully receive the starting package of the y packages and part of the y counters counts to an up-limited value, then the receiver 170, according to the BSN to which the current receiving starting pointer CP(N) corresponds, rewires the multiple count label values indicating whether the counting values of the y counters have achieved an up-limited value to obtain a rewired time-out table. The rewired time-out table has multiple first groups each having a first group value. The first group values form a group time-out table.

Figure 4:
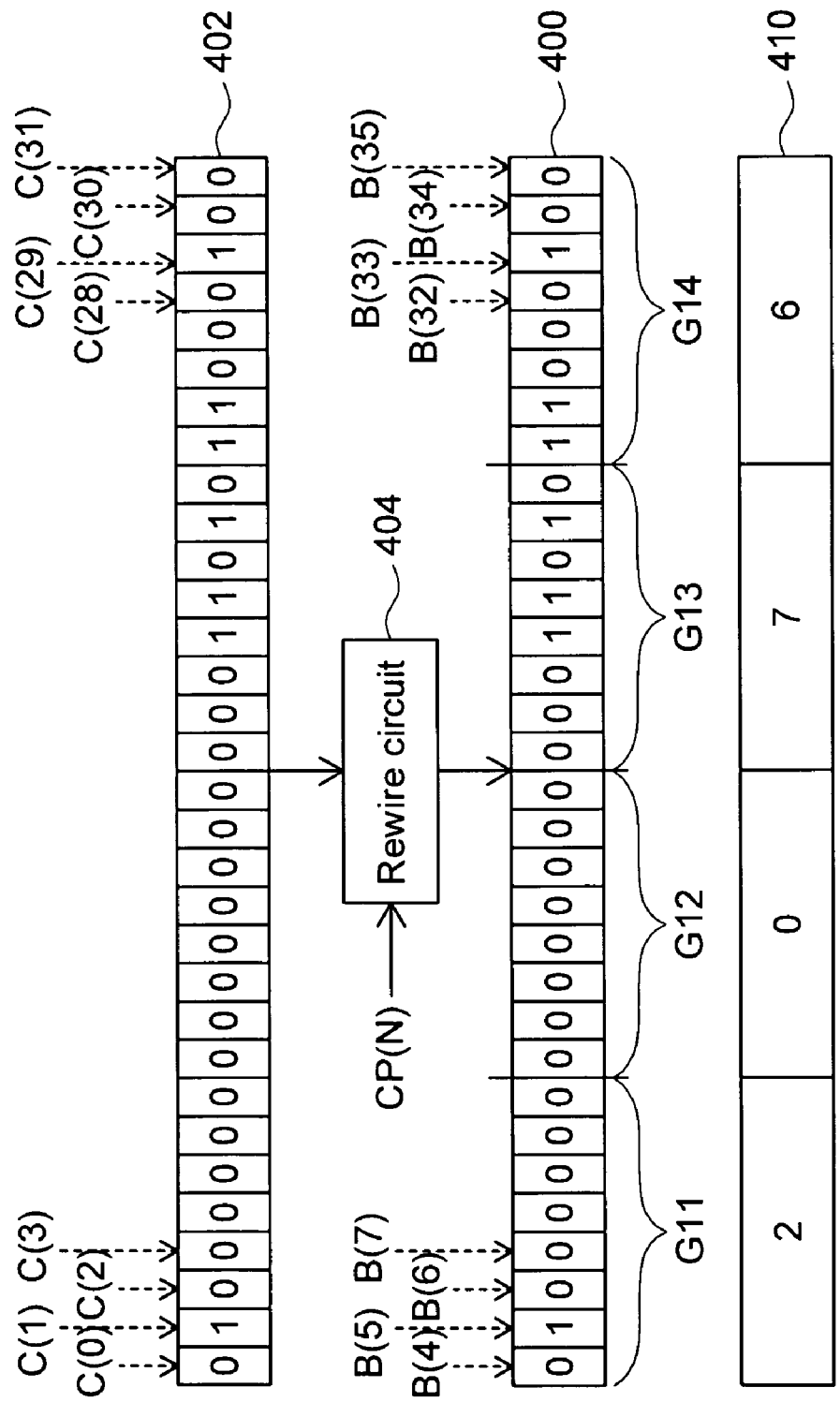
FIG. 4 shows a perspective of a rewired time-out table and a group time-out table according to an embodiment of the invention.

Also, referring to FIG. 4, a perspective of a rewired time-out table and a group time-out table according to an embodiment of the invention is show. In FIG. 4, the window size y is exemplified as 32 and the number of first groups is exemplified as 4. The receiver 170 has an original time-out table 402 for storing y count label values respectively corresponding to the counters C(0)~C(31). The y count label values of the original time-out table 302 respectively indicate whether the counters C(0)~C(31) are time out, that is, whether the counters C(0)~C(31) count to the up-limited value. The count label value of the counter having counted to the up-limited value is a first value, such as "1" but is not limited thereto. For example, if the count label value corresponding to the counter C(28) is 0, the counter C(28) is not time out; if the count label value corresponding to the counter C(29) is 1, the counter C(29) is time out.

The receiver 170 further has a rewire circuit 404, which, according to the BSN to which the current receiving starting pointer CP(N) corresponds, rewires multiple count label values of the original time-out table 402 to obtain a rewired time-out table 400. The y count label values of the rewired time-out table 400 respectively correspond to the BSN values to which the counters C(0)~C(31) correspond, such as B(4) ~B(35). In the rewired time-out table 400, the count label value of the counter having counted to the up-limited value is a first value, such as "1", but the invention is not limited thereto.

The rewired time-out table 400 has 4 first groups G11~G14. The group time-out table 410 is for storing a first group value corresponding to each of the first groups. The first group value is for labeling the position of the maximum BSN value being "1" in each of the first groups. For example, in the rewired time-out table 400, the first group values for the first groups G11~G14 are sequentially 2, 0, 7 and 6, and the positions of the maximum BSN value being "1" of the 4 first groups G11~G14 are respectively located in the 2-nd position of the first group G11 (such as the 2-nd bit counted from the highest bit of the first group G11), the 0-th position of the first group G12, the 7-th position of the first group G13 and the 6-th position of the first group G14.

When executing step 320, step 330 can be executed at the same time. In step 330, if the receiver 170 does not successfully receive a starting package of the y packages and part of the y counters counts to the up-limited value, then the receiver 170, according to the BSN to which the current receiving starting pointer CP(N) corresponds, rewires multiple acknowledge label value to obtain a rewire acknowledge table. The rewire acknowledge table has multiple second groups each having a second group value. The second group values form a group acknowledge table.

Figure 5:
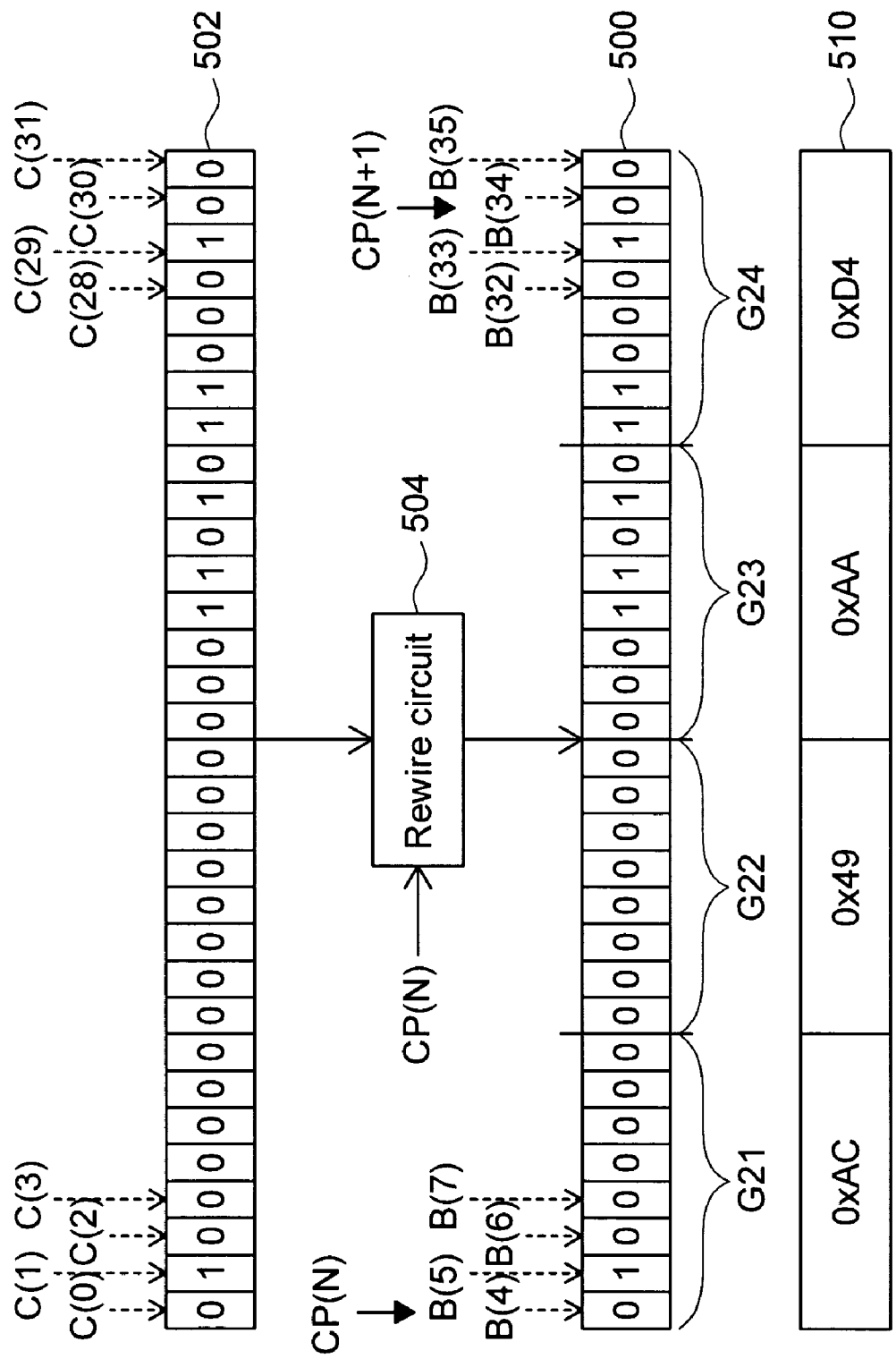
FIG. 5 shows a perspective of a rewire acknowledge table and a group acknowledge table according to an embodiment of the invention.

Referring to FIG. 5, a perspective of a rewire acknowledge table and a group acknowledge table according to an embodiment of the invention is shown. In FIG. 4, the window size y is exemplified as 32 and the number of second groups is exemplified as 4. The receiver 170 has an original acknowledge table 502 for storing y acknowledge label values respectively corresponding to the counters C(0)~C(31). The y acknowledge label values of the original acknowledge table 502 respectively indicate whether the counters C(0)~C(31) are activated, that is, whether the y packages corresponding to the counters C(0)~C(31) are received successfully. The acknowledge label value of the activated counter is a first value, such as "1", but is not limited thereto. For example, if the acknowledge label value corresponding to the counter C(28) is 0, the package to which the counter C(28) corresponds is not received successfully; if the acknowledge label value corresponding to the counter C(29) is 1, the package to which the counter C(29) corresponds is received successfully.

The receiver 170 further has a rewire circuit 504, which, according to the BSN to which the current receiving starting pointer CP(N) corresponds, rewires multiple acknowledge label values of the original acknowledge table 502 to obtain a rewired acknowledge table 500. The y acknowledge label values of the rewired acknowledge table 500 respectively correspond to the BSN values to which the counters C(0)~C(31) correspond, such as B(4)~B(35). In the rewire acknowledge table 500, the acknowledge label value corresponding to the activated counter is labeled as "1", but the invention is not limited thereto.

The rewire acknowledge table 500 has 4 second groups G21~G24. The group acknowledges table 510 is for storing a second group value corresponding to each of the second groups. The second group value is the sum of the 8 acknowledges label values of the second groups. For example, in each second group, the digital value of the 8 1-bit acknowledges label values is used as a corresponding second group value. For example, the second group value corresponding to the second group G24 is '0xD4'.

Then, the method proceeds to step 340, the receiver 170 slides the sliding window W(N) to a sliding window W(N+1) according to the group time-out table and the group acknowledge table, and changes the current receiving starting pointer CP(N) to a current receiving starting pointer CP(N+1) pointing to the BSN to which the first un-received package following the maximum of the BSNs corresponding to the activated counters having counted to the up-limited value corresponds.

Referring to FIG. 4 and FIG. 5. In the group time-out table 410 and the group acknowledge table 510, the group corresponding to a higher BSN is searched with higher priority. That is, the priorities for searching the group time-out table 410 are ranked as groups G14, G13, G12 and G11, and the priorities for searching the group acknowledge table 510 are ranked as groups G24, G23, G22 and G21. In the group time-out table 410, the first group value of the first group G14 having highest priority is 6, not 0, so the maximum (BSN value B(33)) of the BSNs corresponding to the activated counters having counted to the up-limited value can be promptly located from the first group value (equal to 6) of the first group G14. Afterwards, in the group acknowledge table 510, the BSN to which the first un-received package following the maximum of the BSNs corresponding to the activated counters having counted to the up-limited value corresponds can be promptly located from the second group value of the second group G24 corresponding to the first group G14. The BSN is the first BSN whose corresponding acknowledges label value is "0", such as the BSN value B(34) following the BSN value B(33). Following that, the current receiving starting pointer CP(N+1) is changed to point to the BSN, such as the BSN value B(34).

In the steps 320~340, the group time-out table and the group acknowledge table are simultaneously obtained by way of parallel grouping mechanism, and logic operations are performed to the group time-out table and the group acknowledge table to obtain the BSN to which the first un-received package following the maximum of the BSNs corresponding to the activated counters having counted to the up-limited value corresponds. Therefore, the sliding window W(N) is promptly and precisely slid to the sliding window W(N+1).

Moreover, the communication device of the present embodiment of the invention can implement the parallel grouping mechanism independently.

After that, the method proceeds to step 350, the receiver 170 updates the previous receiving starting pointer PP(N) to a previous receiving starting pointer PP(N+1) pointing to the BSN to which the current receiving starting pointer CP(N) corresponds, and continues to receive another y packages according to the current receiving starting pointer CP(N+1).

The abovementioned method of determining whether the BSNs to which the counters C(0)~(y-1) corresponds are located in the overlap area between the W(N) and the W(N+1) and resetting the counters corresponding to the BSNs not located in the overlap area can be achieved by a simple logic operation. In the elaboration below, the m in the counter C(m) can be any positive integer ranging from 0~(y-1), that is, m denotes all integers ranging from 0~(y-1). In the logic determination method disclosed below, the window size y is exemplified as 32.

Figure 6:
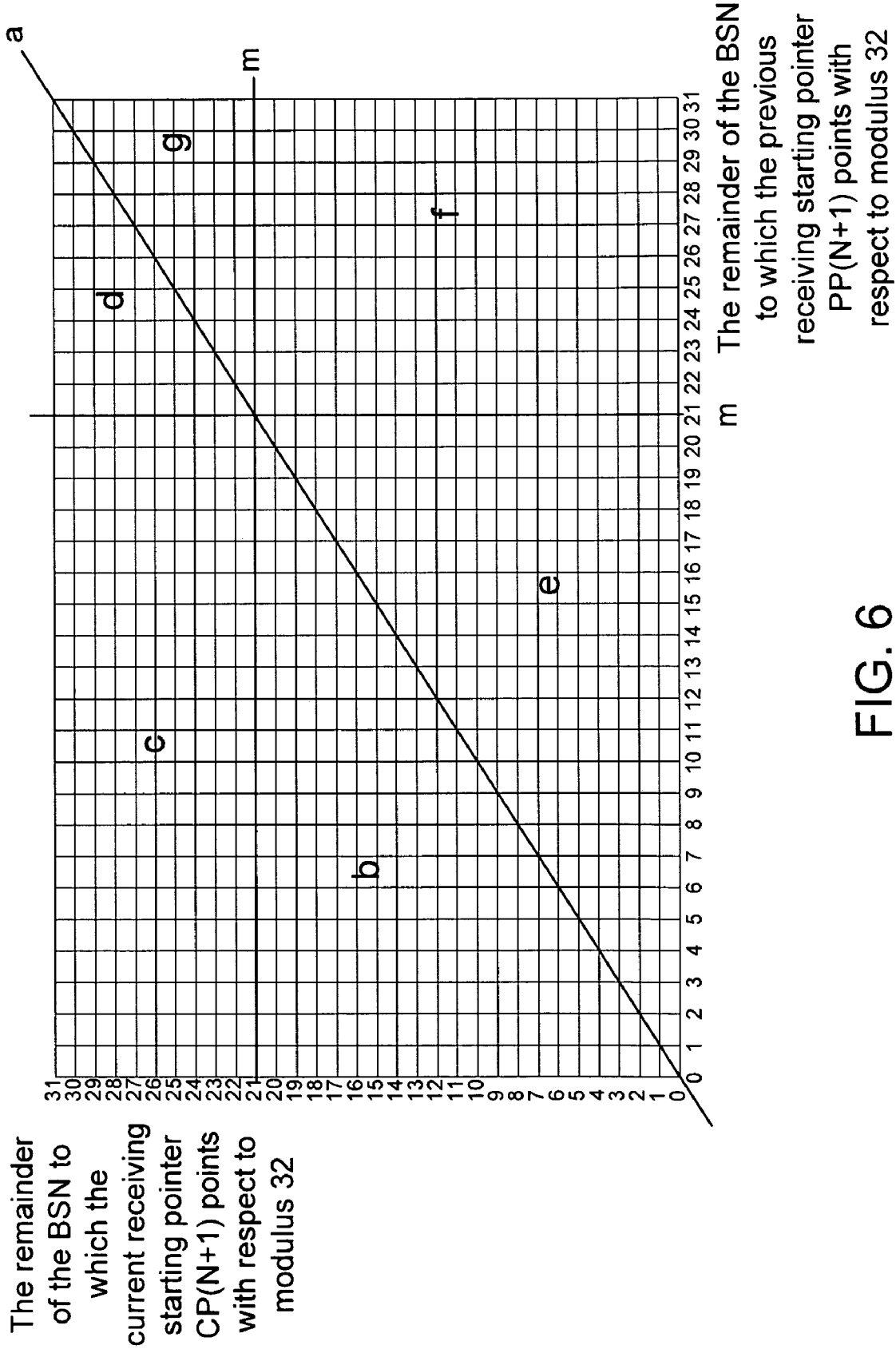
FIG. 6 shows a relationship area diagram of the remainder of the BSN to which the previous receiving starting pointer PP(N+1) points with respect to modulus 32 vs. the remainder of the BSN to which the current receiving starting pointer CP(N+1) points with respect to modulus 32 according to an embodiment of the invention.

Referring to FIG. 6, a relationship area diagram of the remainder of the BSN to which the previous receiving starting pointer PP(N+1) points with respect to modulus 32 vs. the remainder of the BSN to which the current receiving starting pointer CP(N+1) points with respect to modulus 32 according to an embodiment of the invention is shown. The relationship area diagram is divided into 7 areas namely area a to area f.

In the areas a, c, e and g, the BSNs to which the counter C(m) corresponding to the non-starting package corresponds are not located in the overlap area between the sliding window W(N) and the sliding window W(N+1), so the counter C(m) is reset. Let the remainder of the BSN to which the PP(N+1) corresponds with respect to modulus y is defined as R1, and the remainder of the BSN to which the CP(N+1) corresponds with respect to modulus y is defined as R2.

In the area a, the R1 is equal to the R2. When the relationship between the previous receiving starting pointer PP(N+1) and the current receiving starting pointer CP(N+1) is located in the area a, it is determined that the BSN to which the counter C(m) corresponds is not located in the overlap area between the sliding window W(N) and the sliding window W(N+1), so the receiver 170 slides the sliding window W(N) to a sliding window W(N+1) and resets the counter C(m).

Figures 7A, 7B:
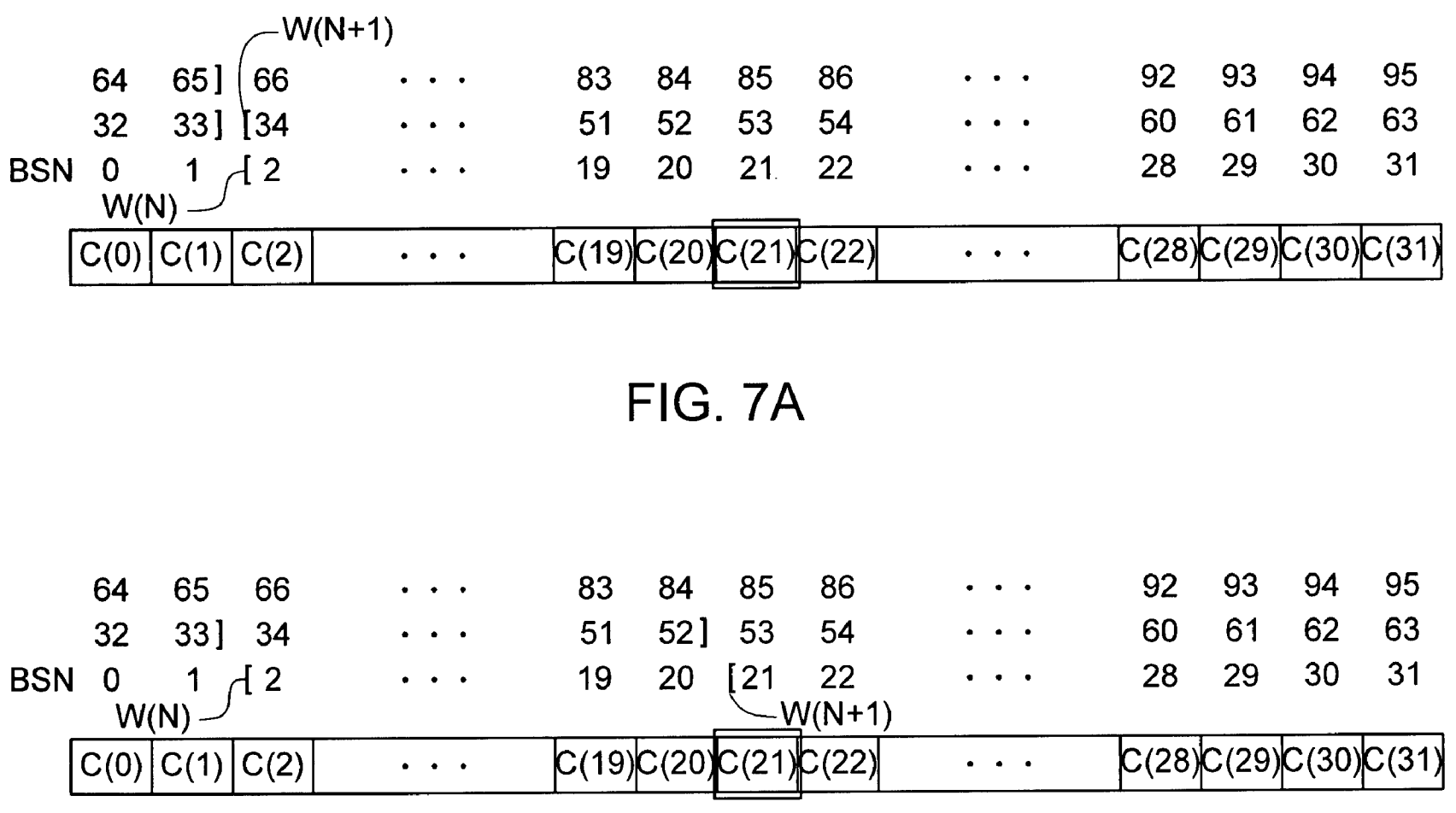

Let the counter C(21) be taken for example. Meanwhile, m is equal to 22. The present method of the invention is not only applicable to the counter C(21) but also applicable to the counters C(0)~C(y-1). Referring to FIG. 7A, an example of the relationship between the sliding window W(N) and the sliding window W(N+1) according to an embodiment of the invention when previous receiving starting pointer PP(N+1) and current receiving starting pointer CP(N+1) are located in area a is shown. The counters C(0)~C(31) sequentially denote 32 counters. If the receiver 170 receives 32 packages whose BSNs sequentially are 2~33 according to the sliding window W(N) first and receives 32 packages whose BSNs sequentially are 34~65 according to the sliding window W(N+1) next, then the BSN to which the previous receiving starting pointer PP(N+1) points is 2, and the BSN to which the current receiving starting pointer CP(N+1) points is 34. As the remainder of 2 with respect to modulus 32 is equal to 2 being the same with the remainder of 34 with respect to modulus 32, it is determined that the BSN to which the counter C(21) corresponds is not located in the overlap area between the sliding window W(N) and the sliding window W(N+1). Thus, when the sliding window W(N) is slid to the sliding window W(N+1), the counter C(21) is reset.

In the area c, the R1 is smaller than or equal to m, the R2 is larger than m and the R1 is smaller than the R2. When the relationship between the previous receiving starting pointer PP(N+1) and the current receiving starting pointer CP(N+1) is located in area c, it is determined that the BSN to which the counter C(m) corresponds is not located in the overlap area between the sliding window W(N) and the sliding window W(N+1). Therefore, when the receiver 170 slides the sliding window W(N) to the sliding window W(N+1), the counter C(m) corresponding to the non-starting package is reset at the same time.

Figures 7C, 7D:
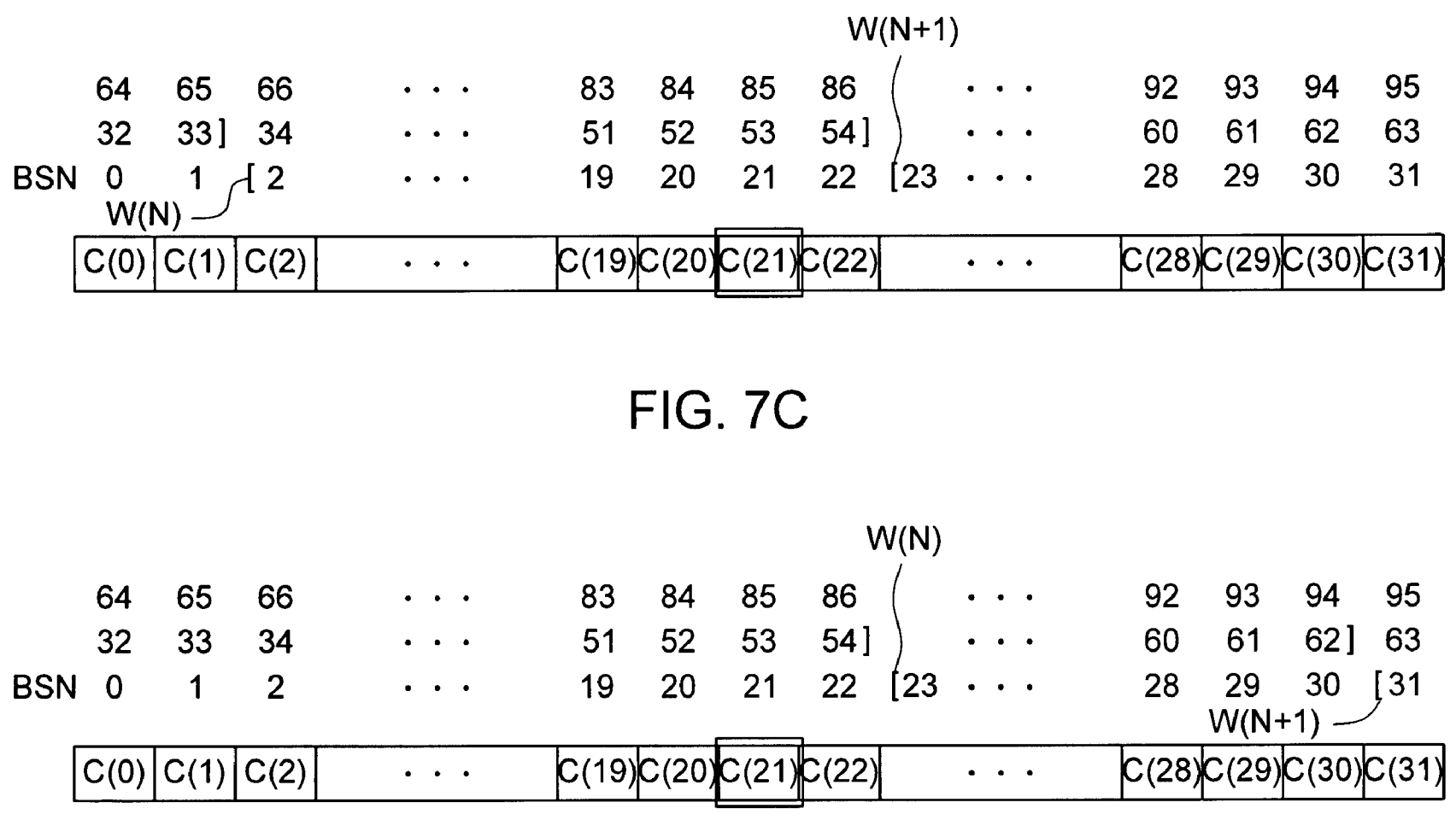

Referring to FIG. 7C, an example of the relationship between the sliding window W(N) and the sliding window W(N+1) according to an embodiment of the invention when previous receiving starting pointer PP(N+1) and current receiving starting pointer CP(N+1) are located in area c is shown. If the receiver 170 receives 32 packages whose BSNs sequentially are 2~33 according to the sliding window W(N) first and receives 32 packages whose BSNs sequentially are 23~54 according to the sliding window W(N+1) next, then the BSN to which the previous receiving starting pointer PP(N+1) points is 2 and the BSN to which the current receiving starting pointer CP(N+1) points is 23. The remainder of 2 with respect to modulus 32 is equal to 2 being smaller than 21. The remainder of 3 with respect to modulus 32 is equal to 23 being larger than 21. As the remainder of the BSN to which the previous receiving starting pointer PP(N+1) points with respect to modulus 32 is equal to 2 being smaller than the remainder of the BSN to which the current receiving starting pointer CP(N+1) points with respect to modulus 32 which is equal to 23, it is determined that the BSN to which the counter C(21) corresponds is not located in the overlap area between the sliding window W(N) and the sliding window W(N+1). Therefore, when the sliding window W(N) is slid to the sliding window W(N+1), the counter C(21) is reset.

In the area e, the R1 is smaller than or equal to m, the R2 is smaller than or equal to m and the R1 is larger than the R2. When the relationship between the previous receiving starting pointer PP(N+1) and current receiving starting pointer CP(N+1) is located in area e, it is determined that the BSN to which the counter C(m) corresponds is not located in the overlap area between the sliding window W(N) and the sliding window W(N+1). Thus, when the receiver 170 slides the sliding window W(N) to the sliding window W(N+1), the counter C(m) is reset at the same time.

Figures 7E, 7F:
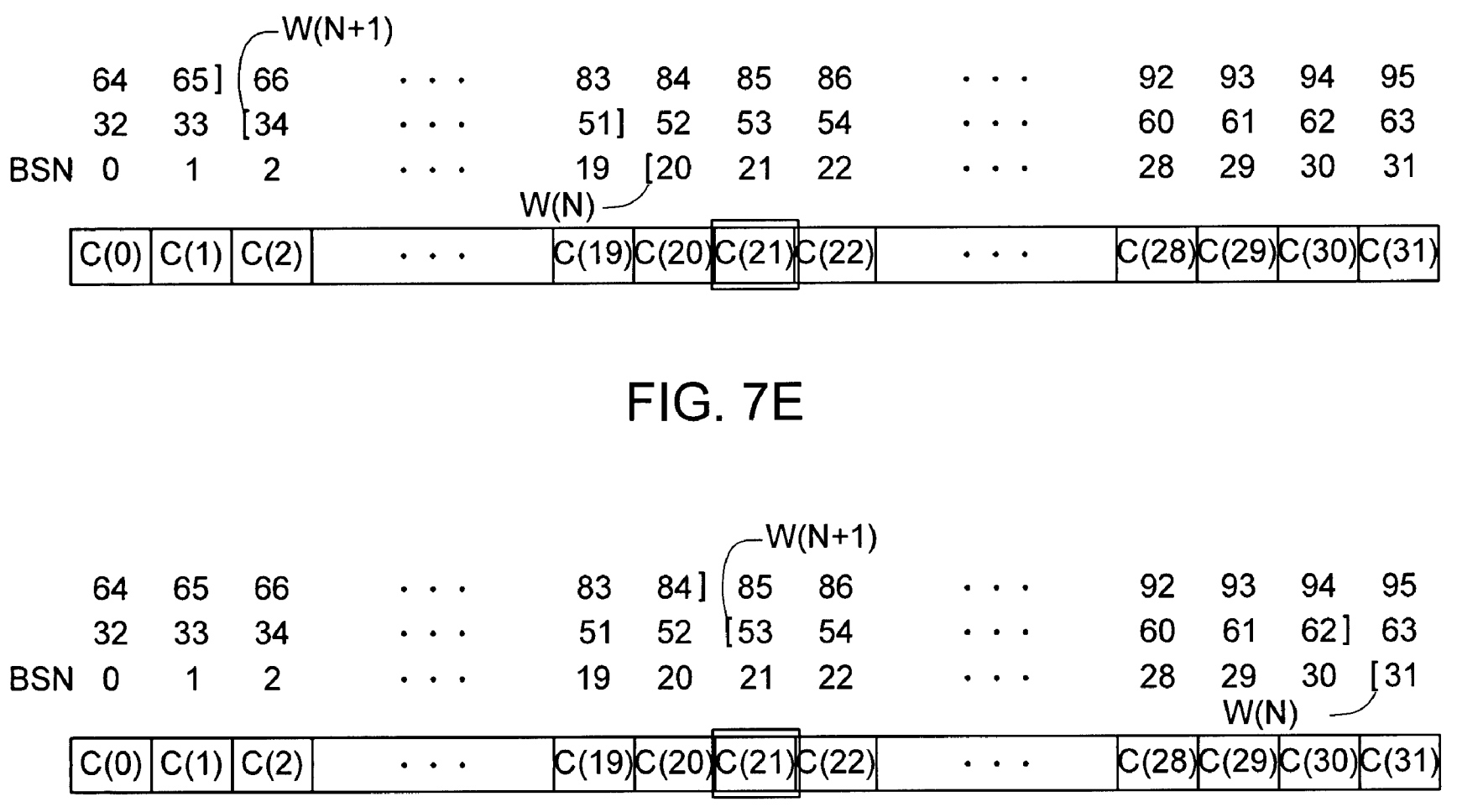

Referring to FIG. 7E, an example of the relationship between the sliding window W(N) and the sliding window W(N+1) according to an embodiment of the invention when previous receiving starting pointer PP(N+1) and current receiving starting pointer CP(N+1) are located in area e is shown. If the receiver 170 receives 32 packages whose BSNs sequentially are 20~51 according to the sliding window W(N) first and receives 32 packages whose BSNs sequentially are 34~65 according to the sliding window W(N+1) next, then the BSN to which the previous receiving starting pointer PP(N+1) points is 20 and the BSN to which the current receiving starting pointer CP(N+1) points is 34. The remainder of 20 with respect to modulus 32 is equal to 20 being smaller than 21. The remainder of 34 with respect to modulus 32 is equal to 2 being larger than 21. As the remainder of the BSN to which the previous receiving starting pointer PP(N+1) points with respect to modulus 32 is equal to 20 being larger than the remainder of the BSN to which the current receiving starting pointer CP(N+1) points with respect to modulus 32 which is equal to 2, it is determined that the BSN to which the counter C(21) corresponds is not located in the overlap area between the sliding window W(N) and the sliding window W(N+1). Thus, when the sliding window W(N) is slid to the sliding window W(N+1), the counter C(21) is reset.

In the area g, the R1 is larger than m, the R2 is larger than m and the R1 is larger than the R2. When the relationship between the previous receiving starting pointer PP(N+1) and the current receiving starting pointer CP(N+1) is located in area g, it is determined that the BSN to which the counter C(m) corresponds is not located in the overlap area between the sliding window W(N) and the sliding window W(N+1). Thus, when the receiver 170 slides the sliding window W(N) to the sliding window W(N+1), the counter C(m) is reset at the same time.

Referring to FIG. 7G, an example of the relationship between the sliding window W(N) and the sliding window W(N+1) according to an embodiment of the invention when previous receiving starting pointer PP(N+1) and the current receiving starting pointer CP(N+1) are located in area g is shown. If the receiver 170 receives 32 packages whose BSNs sequentially are 31~62 according to the sliding window W(N) first and receives 32 packages whose BSNs sequentially are 55~86 according to the sliding window W(N+1) next, then the BSN to which the previous receiving starting pointer PP(N+1) points is 31 and the BSN to which the current receiving starting pointer CP(N+1) points is 55. The remainder of 31 with respect to modulus 32 is equal to 31; the remainder of 55 with respect to modulus 32 is equal to 23. Both 31 and 23 are larger than 21. As the remainder of the BSN to which the previous receiving starting pointer PP(N+1) points with respect to modulus 32 is equal to 31 being larger than the remainder of the BSN to which the current receiving starting pointer CP(N+1) points with respect to modulus 32 which is equal to 23, it is determined that the BSN to which the counter C(21) corresponds is not located in the overlap area between the sliding window W(N) and the sliding window W(N+1). Thus, when the sliding window W(N) is slid to the sliding window W(N+1), the counter C(21) is reset.

Moreover, in the areas b, d and f, the BSN to which the counter C(m) corresponding to the non-starting package corresponds is located in the overlap area between the sliding window W(N) and the sliding window W(N+1), so the counter C(m) will not be reset.

In the area b, the R1 is smaller than or equal to m, the R2 is smaller than or equal to m and the R1 is smaller than the R2. When the relationship between the previous receiving starting pointer PP(N+1) and the current receiving starting pointer CP(N+1) is located in area b, it is determined that the BSNs to which the counter C(m) corresponds is located in the overlap area between the sliding window W(N) and the sliding window W(N+1). Thus, when the receiver 170 slides the sliding window W(N) to the sliding window W(N+1), the receiver 170 does not reset the counter C(m).

Referring to FIG. 7B, an example of the relationship between the sliding window W(N) and the sliding window W(N+1) according to an embodiment of the invention when previous receiving starting pointer PP(N+1) and current receiving starting pointer CP(N+1) are located in area b is shown. If the receiver 170 receives 32 packages whose BSNs sequentially are 2~33 according to the sliding window W(N) first and receives 32 packages whose BSNs sequentially are 21~52 according to the sliding window W(N+1) next, then the BSN to which the previous receiving starting pointer PP(N+1) points is 2 and the BSN to which the current receiving starting pointer CP(N+1) points is 21. The remainder of 2 with respect to modulus 32 is equal to 2; the remainder of 21 with respect to modulus 32 is equal to 21. Both 2 and 21 are smaller than or equal to 21. As the remainder of the BSN to which the previous receiving starting pointer PP(N+1) points with respect to modulus 32 is equal to 2 being smaller than the remainder of the BSN to which the current receiving starting pointer CP(N+1) points with respect to modulus 32 which is equal to 21, it is determined that the BSN to which the counter C(21) corresponds is located in the overlap area between the sliding window W(N) and the sliding window W(N+1). Thus, when the sliding window W(N) is slid to the sliding window W(N+1), the counter C(21) is not reset. That is, the counting value of the counter C(21) is added by 1 if the counter C(21) is counting, and the counter C(21) remains the same state if the counter C(21) has not yet been activated.

In the area d, the R1 is larger than m, the R2 is larger than m and the R1 is smaller than the R2. When the relationship between the previous receiving starting pointer PP(N+1) and the current receiving starting pointer CP(N+1) is located in the area d, it is determined that the BSN to which the counter C(m) corresponds is located in the overlap area between the sliding window W(N) and the sliding window W(N+1). Thus, when the receiver 170 slides the sliding window W(N) to the sliding window W(N+1), the counter C(m) will not be reset.

Referring to FIG. 7D, an example of the relationship between the sliding window W(N) and the sliding window W(N+1) according to an embodiment of the invention when previous receiving starting pointer PP(N+1) and current receiving starting pointer CP(N+1) are located in area d is shown. If the receiver 170 receives 32 packages whose BSNs sequentially are 23~54 according to the sliding window W(N) first and receives 32 packages whose BSNs sequentially are 31~62 according to the sliding window W(N+1) next, then the BSN to which the previous receiving starting pointer PP(N+1) points is 23, and the BSN to which the current receiving starting pointer CP(N+1) points is 31. The remainder of 23 with respect to modulus 32 is equal to 23; the remainder of 31 with respect to modulus 32 is equal to 31. Both 23 and 31 are larger than 21. As the remainder of the BSN to which the previous receiving starting pointer PP(N+1) points with respect to modulus 32 is equal to 23 being smaller than the remainder of the BSN to which the current receiving starting pointer CP(N+1) points with respect to modulus 32 which is equal to 31, it is determined that the BSN to which the counter C(21) corresponds is located in the overlap area between the sliding window W(N) and the sliding window W(N+1). Thus, when the sliding window W(N) is slid to the sliding window W(N+1), the counter C(21) will not be reset.

In the area f, the R1 is larger than m, the R2 is smaller than or equal to m and the R1 is larger than the R2. When the relationship between the previous receiving starting pointer PP(N+1) and the current receiving starting pointer CP(N+1) is located in the area f, it is determined that the BSN to which the counter C(m) corresponds is located in the overlap area between the sliding window W(N) and the sliding window W(N+1). Thus, when the receiver 170 sides the sliding window W(N) to the sliding window W(N+1), the counter C(m) will not be reset.

Referring to FIG. 7F, shows an example of the relationship between the sliding window W(N) and the sliding window W(N+1) according to an embodiment of the invention when previous receiving starting pointer PP(N+1) and current receiving starting pointer CP(N+1) are located in area f is shown. If the receiver 170 receives 32 packages whose BSNs sequentially are 31~62 according to the sliding window W(N) first and receives 32 packages whose BSNs sequentially are 53~84 according to the sliding window W(N+1) next, then the BSN to which the previous receiving starting pointer PP(N+1) points is 31 and the remainder of the BSN to which the current receiving starting pointer CP(N+1) points is 53. The remainder of 31 with respect to modulus 32 is equal to 31 being larger than 21; the remainder of 53 with respect to modulus 32 is equal to 21 being smaller than or equal to 21. As the remainder of the BSN to which the previous receiving starting pointer PP(N+1) points with respect to modulus 32 is equal to 31 being larger than the remainder of the BSN to which the current receiving starting pointer CP(N+1) points with respect to modulus 32 which is equal to 21, it is determined that the BSN to which the counter C(21) corresponds is located in the overlap area between the sliding window W(N) and the sliding window W(N+1). Thus, when the sliding window W(N) is slid to the sliding window W(N+1), the counter C(21) will not be reset.

To determine whether other counters need to be reset, the value of m can be reset to obtain a relationship area of the remainder of the BSN to which the PP(N+1) of FIG. 6 corresponding to the reset value of m corresponds with respect to modulus 32 vs. the remainder of the BSN to which CP(N+1) corresponds with respect to modulus 32. Then, whether to reset the counter(m) is determined according to whether the PP(N+1) and the CP(N+1) are located in which area among area a to area f. For example, when the W(N) is slid to W(N+1), whether the counter C(2) needs to be reset is determined by way of setting m as 2 and locating the corresponding area of the PP(N+1) and the CP(N+1).

Moreover, in the above embodiments, the receiver 170 corresponding to the window size y of the sliding window has y counters. However, the present embodiment of the invention can also be achieved by using only (y−1) counters. That is, the number of the counters can be reduced by 1. Preferably, the counter omitted here is originally the counter corresponding to the BSN to which the current receiving starting pointer CP(N) corresponds. That is, the (y−1) counters correspond to the remaining packages other than the starting package of the y packages received by the sliding window. As the receiver 171 slides to the sliding window on receiving the starting package, the counter corresponding to the starting package can be omitted because whether the corresponding counter of the starting package is activated does not affect the sliding of the sliding window. The movements when the receiver 170 of the present embodiment of the invention uses (y−1) counters are similar to that when the receiver 170 uses y counters, and are not repeated here.

According to the method for receiving data and the wireless communication device disclosed in the above embodiments of the invention, whether to reset the counter after the sliding window slides is determined according to whether the counter is located in the overlap area between two subsequent sliding windows. The counters can be re-used, and the required number of counters is less than a half of the maximum BSN value of the packages. As a result, the number of counters as well as the cost and the chip size are reduced. Moreover, by way of parallel grouping mechanism, the next starting position of the sliding window is promptly and precisely positioned and the overall efficiency of the receiver is effectively increased.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A method for receiving data applied to a communication device, comprising:
 (a) receiving a plurality of packages by a receiver according to a sliding window W(N) having been slid for N

15 times, N is a positive integer, the W(N) corresponds to a plurality of block sequence numbers (BSNs), both the packages and a plurality of counters of the receiver correspond to the BSNs to which the W(N) corresponds;

(b) sliding the W(N) to a W(N+1) by the receiver if a starting package of the packages is received successfully;

(c) activating the counter corresponding to a non-starting package for counting by the receiver if the non-starting package of the packages is received successfully;

(d) sliding the W(N) to the W(N+1) by the receiver if the starting package of the packages is not received successfully and part of the counters counts to an up-limited value; and (e) continuously receiving another plurality of packages by the receiver according to the W(N+1) and determining whether the BSNs to which the counters correspond are located in the overlap area between the W(N) and the W(N+1), wherein when at least one BSN to which at least one counter among the counters corresponds is not located in the overlap area, the at least one counter corresponding to the at least one BSN not located in the overlap area is reset, and each of the at least one counter corresponding to the at least one BSN not located in the overlap area corresponds to another BSN.

2. The method for receiving data applied to a communication device according to claim 1, wherein a current receiving starting pointer CP(N) points to the BSN to which the starting position of the W(N) corresponds, a previous receiving starting pointer PP(N) points to the BSN to which the starting position of a W(N−1) corresponds, and when the W(N) is slid to the W(N+1) by the receiver, the CP(N) is changed to a CP(N+1) pointing to the BSN to which the first un-received package following the maximum of the BSNs corresponding to the activated counters having counted to the up-limited value corresponds, and the PP(N) is updated as a PP(N+1) pointing to the BSN to which the CP(N) points.

3. The method for receiving data applied to a communication device according to claim 2, wherein the window size of the sliding window is defined as y being a positive integer, the counters comprise counters C(0)~C(y−1), the remainder of the BSN to which the PP(N+1) points with respect to modulus y is defined as R1, the remainder of the BSN to which the CP(N+1) points with respect to modulus y is defined as R2, the step (e) comprises:

(e1) resetting the C(m) by the receiver if the R1 is equal to the R2, wherein m is a positive integer ranging from 0~(y−1);

(e2) resetting the C(m) by the receiver if the R1 is smaller than or equal to m, the R2 is larger than m, and the R1 is smaller than the R2;

(e3) resetting the C(m) by the receiver if the R1 is smaller than or equal to m, the R2 is smaller than or equal to m, and the R1 is larger than the R2; and (e4) resetting the C(m) by the receiver if the R1 is larger than m, the R2 is larger than m, and the R1 is larger than the R2.

4. The method for receiving data applied to a communication device according to claim 2, wherein the window size of the sliding window is defined as y being a positive integer, the counters comprise counters C(0)~C(y−1), the remainder of the BSN to which the PP(N+1) points with respect to modulus y is defined as R1, the remainder of the BSN to which the CP(N+1) points with respect to modulus y is defined as R2, the step (e) comprises:

16

(e5) not resetting the C(m) if the R1 is smaller than or equal to m, the R2 is smaller than or equal to m, and the R1 is smaller than the R2, wherein m is a positive integer ranging from 0~(y−1);

(e6) not resetting the C(m) if the R1 is larger than m, the R2 is larger than m, and the R1 is smaller than the R2; and (e7) not resetting the C(m) if the R1 is larger than m, the R2 is smaller than or equal to m and the R1 is larger than the R2.

5. The method for receiving data applied to a communication device according to claim 2, wherein the step (d) comprises:

(d1) rewiring a plurality of count label values indicating whether each of the counting values of the counters has achieved an up-limited value by the receiver according to the BSN to which the CP(N) points to obtain a rewired time-out table having a plurality of first groups each having a first group value, wherein the first group values form a group time-out table;

(d2) rewiring a plurality of acknowledge label values indicating whether the packages are received successfully by the receiver according to the BSN to which the CP(N) points to obtain a rewire acknowledge table having a plurality of second groups each having a second group value, wherein the second group values form a group acknowledge table; and (d3) sliding the starting position of the W(N) to the BSN to which the CP(N+1) corresponds by the receiver according to the group time-out table and the group acknowledge table.

6. The method for receiving data applied to a communication device according to claim 5, wherein in the rewired time-out table, the count label value corresponding to the counter having counted to the up-limited value is a first value, and the group time-out table labels the position of the maximum BSN among the first values of the first groups.

7. The method for receiving data applied to a communication device according to claim 5, wherein in the step (d3), logic operation is performed to the group acknowledge table and the group time-out table to obtain the BSN to which the first un-received package following the maximum of the BSNs corresponding to the activated counters having counted to the up-limited value corresponds.

8. The method for receiving data applied to a communication device according to claim 1, wherein the number of the counters is the window size of the sliding window deducted by 1, and the counters correspond to the remaining packages other than the starting package.

9. A method for receiving data applied to a communication device, comprising:

(a) receiving a plurality of packages by a receiver according to a sliding window W(N) having been slid for N times, N is a positive integer, the W(N) corresponds to a plurality of block sequence numbers (BSNs), both the packages and a plurality of counters of the receiver all correspond to the BSNs to which the W(N) corresponds;

(b) sliding the W(N) to a W(N+1) by the receiver if a starting package of the packages is received successfully;

(c) activating the counter corresponding to a non-starting package for counting by the receiver if the non-starting package of the packages is received successfully;

(d) rewiring a plurality of count label values indicating whether each of the counting values of the counters has achieved an up-limited value to obtain a rewired time-out table by the receiver if the starting package of the packages is not received successfully and part of the counters counts to the up-limited value, wherein the rewired time-out table has a plurality of first groups each having a first group values, and the first group values form a group time-out table;

(e) rewiring a plurality of acknowledge label values indicating whether the packages are received successfully to obtain a rewire acknowledge table by the receiver if the starting package of the packages is not received successfully and part of the counting values of the counters has achieved the up-limited value, wherein the rewire acknowledge table has a plurality of second groups each having a second group value, and the second group values forms a group acknowledge table;

(f) sliding the W(N) to the W(N+1) by the receiver according to the group time-out table and the group acknowledge table; and (g) continuously receiving another plurality of packages by the receiver according to the W(N+1).

10. The method for receiving data applied to a communication device according to claim 9, wherein a current receiving starting pointer CP(N) points to the BSN to which the starting position of the W(N) corresponds, the count label values and the acknowledge label values are rewired by the receiver according to the BSN to which the CP(N) points, and when the W(N) is slid to the W(N+1), the CP(N) is changed to a CP(N+1) pointing to the BSN to which the first un-received package following the maximum of the BSNs corresponding to the activated counters having counted to the up-limited value corresponds.

11. The method for receiving data applied to a communication device according to claim 9, wherein in the rewired time-out table, the count label value corresponding to the counter having counted to the up-limited value is a first value, and the group time-out table labels the position of the maximum BSN among the first values of the first groups.

12. The method for receiving data applied to a communication device according to claim 9, wherein in the step (f), the receiver performs logic operation to the group acknowledge table and the group time-out table to obtain the BSN to which the first un-received package following the maximum of the BSNs corresponding to the activated counters having counted to the up-limited value corresponds.

13. A communication device, comprising:
a receiver used for receiving a plurality of packages according to a sliding window W(N) having been slid for N times, wherein N is a positive integer, the W(N) corresponds to a plurality of block sequence numbers (BSNs), the packages correspond to the BSNs to which the W(N) corresponds, the receiver comprising:
an ARQ receiver module for retrieving the packages according to the sliding window W(N);
a plurality of counters corresponding to the BSNs to which the W(N) corresponds, wherein the counter corresponding to a non-starting package is activated if the receiver successfully receives the non-starting package of the packages: and
a receiver buffer used for temporarily storing the packages;
wherein the receiver further slides the W(N) to a W(N+1) if the receiver successfully receives a starting package of the packages;
wherein the receiver further slides the W(N) to the W(N+1) if the receiver does not successfully receive the starting package of the packages and part of the counters counts to an up-limited value;
wherein the receiver further continuously receives another plurality of packages according to the W(N+1) and determines whether the BSNs to which the counters correspond is located in the overlap area between the W(N) and the W(N+1);
wherein when at least one BSN to which at least one counter among the counters corresponds is not located in the overlap area, the receiver further resets the at least one counter corresponding to the at least one BSN not located in the overlap area, and each of the at least one counter corresponding to the at least one BSN not located in the overlap area corresponds to another BSN.

14. The communication device according to claim 13, wherein the packages are transmitted from a transmitter, the receiver further outputs a plurality of acknowledge label values indicating whether the packages are received successfully to the transmitter, the receiver further comprises a current receiving starting pointer CP(N) and a previous receiving starting pointer PP(N), the CP(N) points to the BSN to which the starting position of the W(N) corresponds, the PP(N) points to the BSN to which the starting position of a W(N−1) corresponds, and when the W(N) is slid to the W(N+1), the receiver changes the CP(N) to a CP(N+1) pointing to the BSN to which the first un-received package following the maximum of the BSNs corresponding to the activated counters having counted to the up-limited value corresponds, and the receiver updates the PP(N) as a PP(N+1) pointing to the BSN to which the CP(N) points.

15. The communication device according to claim 14, wherein the window size of the sliding window is defined as y being a positive integer, the counters comprise counters C(0)~C(y−1), the remainder of the BSN to which the PP(N+1) points with respect to modulus y is defined as R1, the remainder of the BSN to which the CP(N+1) points with respect to modulus y is defined as R2, the receiver resets the counter corresponding to the non-starting package if the R1 is equal to the R2, the receiver resets the C(m) if the R1 is smaller than or equal to n, the R2 is larger than n and the R1 is smaller than the R2, m is an integer ranging from 0~(y−1), the receiver resets the C(m) if the R1 is smaller than or equal to m, the R2 is smaller than or equal to m and the R1 is larger than the R2, the receiver resets the C(m) if the R1 is larger than m, the R2 is larger than m and the R1 is larger than the remainder of the R2.

16. The communication device according to claim 14, wherein the window size of the sliding window is defined as y being a positive integer, the counters comprise counters C(0)~C(y−1), the remainder of the BSN to which the PP(N+1) points with respect to modulus y is defined as R1, the remainder of the BSN to which the CP(N+1) points with respect to modulus y is defined as R2, the receiver does not reset the C(m) if the R1 is smaller than or equal to m, the R2 is smaller than or equal to m and the R1 is smaller than the R2, m is an integer ranging from 0~(y−1), the receiver does not reset the C(m) if the R1 is larger than m, the R2 is larger than m and the R1 is smaller than the R2, and the receiver does not reset the C(m) if the R1 is larger than m, the R2 is smaller than or equal to m and the R1 is larger than the R2.

17. The communication device according to claim 14, wherein the receiver further rewires a plurality of count label values indicating whether each of the counting values of the counters has achieved the up-limited value according to the BSN to which the CP(N) points to obtain a rewired time-out table having a plurality of first groups each having a first group value, the first group values form a group time-out table, the receiver further rewires the acknowledge label values according to the BSN to which the CP(N) points to obtain a rewire acknowledge table having a plurality of second groups each having a second group value, the second group values form a group acknowledge table, and the receiver slides the starting position of the W(N) to the BSN to which the CP(N+1) corresponds according to the group time-out table and the group acknowledge table.

18. The communication device according to claim 17, wherein in the rewired time-out table, the count label value corresponding to the counter having counted to the up-limited value is a first value, and the group time-out table labels the position of the maximum BSN among the first values of the first groups.

19. The communication device according to claim 17, wherein the receiver further performs logic operation to the group acknowledge table and the group time-out table to obtain the BSN to which the first un-received package following the maximum of the BSNs corresponding to the activated counters having counted to the up-limited value corresponds.

20. The communication device according to claim 13, wherein the number of the counters is the window size of the sliding window deducted by 1, and the counters correspond to the remaining packages other than the starting package.

* * * * *